June 12, 1945.   L. J. B. LA COSTE ET AL   2,377,889
FORCE MEASURING INSTRUMENT
Filed Aug. 12, 1939   2 Sheets-Sheet 1

LUCIEN J. B. LACOSTE
ARNOLD ROMBERG
INVENTORS.

BY Jesse R. Stone
Lester B. Clark.
ATTORNEYS.

Patented June 12, 1945

2,377,889

UNITED STATES PATENT OFFICE 2,377,889

FORCE MEASURING INSTRUMENT

Lucien J. B. La Coste and Arnold Romberg, Austin, Tex.

Application August 12, 1939, Serial No. 289,808

10 Claims. (Cl. 73—382)

This invention relates to a force measuring instrument which is particularly adaptable for measuring with a high degree of accuracy minute changes in gravimetric force.

The primary object of the invention is to provide an instrument for the measurement of small changes in gravity, such changes being of especial significance in the location of subterranean inhomogeneities indicative of the location of valuable deposits within the earth. Attention is directed to the fact that measured changes in gravity may be indicative of change in altitude or in changes in latitude where observations are made at sea level at points differently spaced from the equator and it is intended that the device of the invention comprehends such use.

It is also an object to provide a device having a gravity responsive system which is so constructed and supported as to have an extremely long period.

Another object is to provide a device of the class described in which the gravity responsive element is supported by a resilient supporting member extending diagonal thereto, an additional resilient supporting member or members being provided to counterbalance the horizontal component of the force exerted by the resilient supporting member and thereby bring the system to a state of equilibrium.

Another object is to provide a device of the class described in which the resilient supporting member for counterbalancing the measured force is a zero length spring.

Still another object is the provision of a device of the class decribed in which the upper end of the resilient supporting member is attached to a vertically movable support and means is provided to measurably move such support to bring the moving system to a predetermined position.

These and other objects will be apparent from the following description directed to an illustrated embodiment of the invention shown in the drawings in which.

Figure 1:
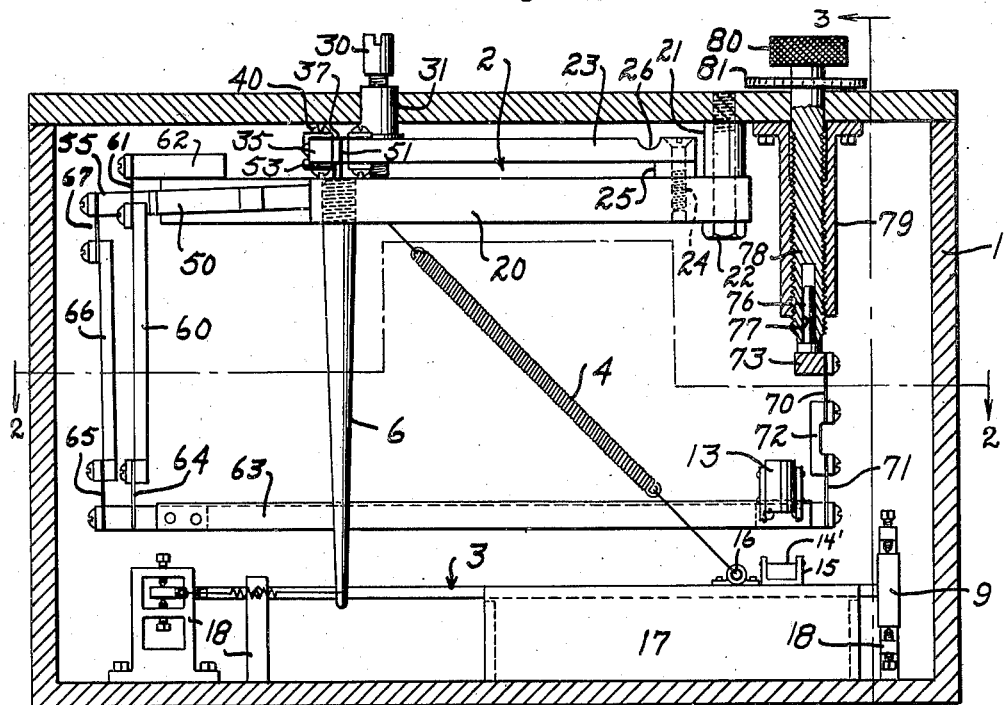
Fig. 1 is a vertical sectional view thru a constrution embodying the invention, certain parts being omitted for the sake of clarity.
Figure 2:
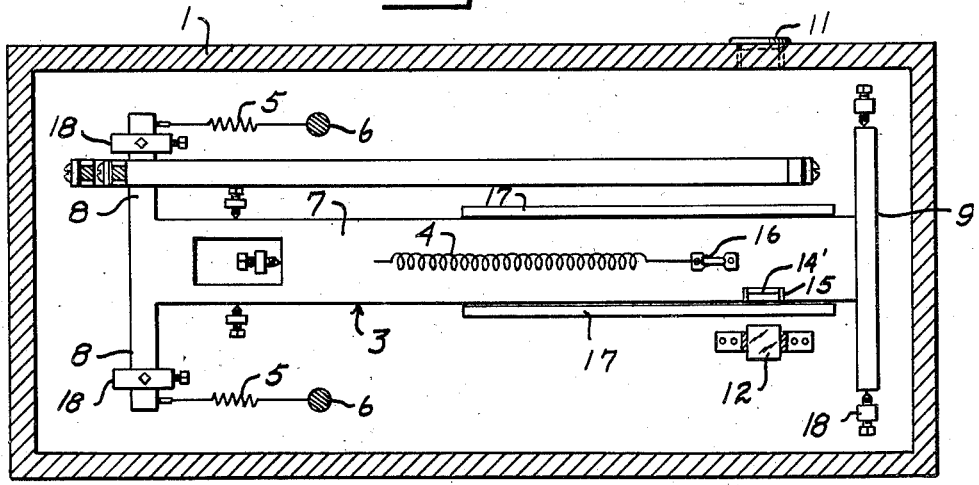
Fig. 2 is a horizontal sectional view taken on line 2—2 in Fig. 1.
Figure 4:
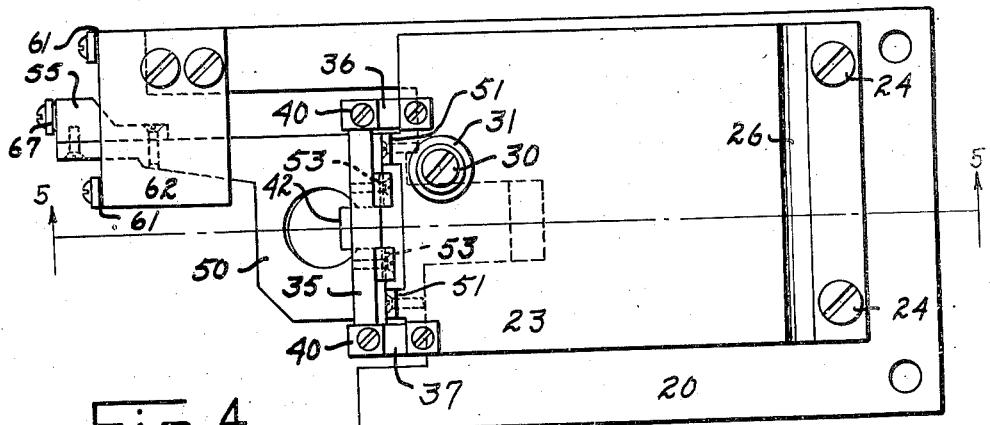
Fig. 4 is a plan view of the construction whereby the upper support member for the force responsive system is movably mounted.
Figure 5:
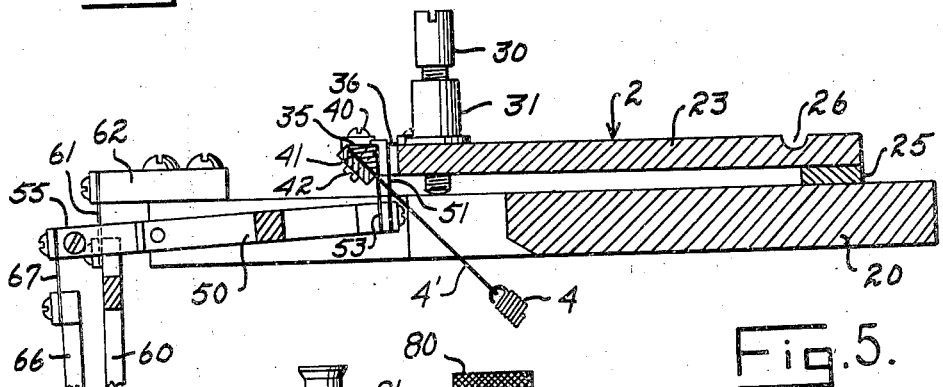
Fig. 5 is a vertical sectional view taken on line 5—5 of Fig. 4.

The instrument comprising the invention is such as to enable the measurement of variations in a force with an extreme high degree of accuracy. In order to maintain such high accuracy in instruments of this type the instrument must be maintained at a temperature which is substantially constant and it is intended that the structure hereinafter described shall be enclosed in a constant temperature chamber in a manner well known in the art, the control and observation elements of the instrument being so constructed that the instrument may be operated exteriorly of such chamber.

In the illustrated embodiment of the invention a frame or housing 1 surrounds the essential parts of the instrument which includes an upper support assembly generally referred to as 2.

A composite gravity responsive element or mass 3 is supported from the assembly 2 by means of a spring 4 which is attached to the assembly and is inclined downwardly therefrom to its attachment to the mass 3 in such manner that the force exerted by the spring acts thru the center of gravity of the suspended mass. The left end of the mass 3 has outward projections 8 forming a T-configuration and a horizontal force is exerted upon these projections thru springs 5 having their inner ends attached to the lower end of posts 6 secured to the assembly 2 and extending downwardly therefrom. In this manner the horizontal component of force exerted by the spring 4 is counterbalanced and the mass 3 is supported in equilibrium.

Figure 3:
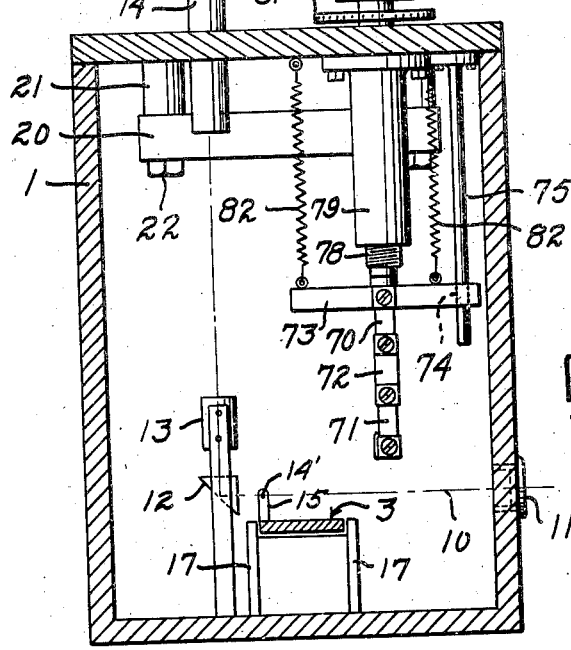
Fig. 3 is a vertical sectional view taken on line 3—3 in Fig. 1.

The position of the mass 3 is determined by means of a light beam indicated at 10 in Fig. 3 which passes thru a window 11 in the housing 1 and is directed upwardly by means of a prism 12, thence thru an objective 13 to a micrometer eye piece 14 which passes thru the top of the housing 1. The position of a cross hair 14' mounted in a frame 15 on the mass 3 is observed thru the micrometer eye piece and indicates the position of the mass 3.

The preferred manner of making observations to determine changes in gravimetric force as the instrument is moved from point to point is that of bringing the mass 3 into a predetermined position at each point of observation. This is accomplished in the present invention by vertically moving the upper support for the spring 4, the telescopic system being used to observe when the mass reaches the desired position. The amount of movement of the upper support for the spring 4 necessary to bring the system to such predetermined position is a measure of the change in gravimetric force from that at a station previously observed. Attention will now be directed to instrumentalities whereby it is possible to accurately and repeatably alter the position of the spring support by a measurable amount.

A plate 20 is attached to the lower surface of the top of the housing 1 by means of a pillar 21 and cap screws 22 of which any suitable number may be used. A second plate 23 is secured to the plate 20 by means of screws 24 and is held in spaced relation with the plate 20 by means of a spacer bar 25. This second plate is scored transversely at 26 to increase the flexibility thereof so that the opposite end of the plate may be moved in a vertical direction by means of an adjusting screw 30 which threadably passes thru a bushing 31 attached to the plate 23. The lower end of the screw 30 engages the upper surface of the plate 20 and hence enables a cross adjustment of the position of the outer or left end of the plate 23 relative to the lower plate 20. The upper support for the spring 4 is attached to the end of the plate 23 in a manner that will now be described.

A support block 35 is positioned adjacent the end of the plate 23 and is attached thereto by means of two pairs of leaf springs 36 and 37. Each of these pairs of springs has spring members of which the ends overlie and underlie respectively the upper and lower surfaces of the plate 23 and the block 35 and are secured in place by means of fasteners such as screws 40.

It is apparent that the block 35 is constrained by the construction just described to move substantially vertically relative to the plate 23. Such movement is desired in order to alter the position of the upper support for the spring 4 which support is provided thru a cutaway portion in the block 35 to provide a surface 41 against which the end of the spring 4 or extension 4' thereof is clamped by a clamp screw and washer generally referred to as 42.

It is essential that the mechanism to be here described for measurably moving the block 35 be devoid of all backlash or other freedom of movement that would vitiate obtaining of desired results. Further structure by means of which these requirements are fulfilled will now be described.

A lever 50 is attached to the plate 23 thru spaced leaf springs 51 which extend vertically and have their opposite ends attached to these elements. These leaf springs thus act as a fulcrum for the lever 50 and the arrangement is such that sideward movement of the lever as well as backlash for reversal of movement are avoided.

A second pair of leaf springs 53 have their ends similarly attached to the block 35 and the lever 50. These springs lie in a plane which is slightly displaced from that of the springs 53. It is apparent that movement of the outer end 55 of the lever 50 will produce vertical movement of the block 35 and such movement is proportional to the ratio of the total length of the lever 50 to the distance between the planes determined by the springs 51 and 53. In practice this ratio is approximately 30/1, although it is to be understood that this specific relation is expressed merely by way of illustration and not by way of limitation.

The movement of the outer end 55 of the arm 50 is determined by a lever arrangement including a vertical rod 60 which is yoked at its upper end and is attached by means of a pair of springs 61 to a block 62 fixed upon the plate 20. The lower end of the rod 60 is fixed to a lever 63 thru leaf spring 64 in parallel relation with a leaf spring 65 attached to the lower end of a second rod 66. The upper end of the rod 66 is attached to the outer end 55 of the arm 50 thru a leaf spring 67.

As already indicated the leaf springs 64 and 65 lie in substantially parallel planes and are closely spaced so that the ratio of the total length of the lever 63 to the distance between the springs is relatively large. Again attention is directed to the fact that the construction is such that sideward displacement of parts and backlash are avoided.

Movement of the lever 63 is movably controlled by a mechanism including the assembly of leaf springs 70 and 71 and an intermediate link 72. The upper end of this assembly is attached to a cross head 73 which, as best seen in Fig. 3, has an opening 74 to slidably receive a pilot or guiding rod 75 depending from the top of the housing 1. The cross head has a central upwardly projecting pin portion 76 (Fig. 1) which enters an opening 77 in the lower end of a screw 78 peripherally threaded to fit within the bushing 79 also depending from the top of the housing 1. The screw 78 may be rotated as by knurled head 80 so that upward or downward movement of the cross head 73 may be effected. The amount of movement of the cross head 73 is determined by means of a graduated disc 81 adjacent the knurled head 80. To avoid any effect of backlash at the cross head 73 a pair of springs 82 (Fig. 3) are attached to the top of the housing 1 to the cross head at opposite sides of the pin portion 76, whereby a contact surface on the crosshead is constantly held in engagement with the lower end of the screw 78.

Further attention is directed to the mass 3 which is shown as a weighted beam comprising a beam portion 7 having the sideward projections 8 at one end to which the springs 5 are attached. The opposite end has a mass 9 rigidly attached thereto. This composite structure is such that the lower point of attachment 16 of the spring 4 is at or approximately at the center of gravity of the beam.

In instruments of the present type a long period of oscillation of the moving system is desirable since such feature enables the elimination of erroneous results and facilitates the making of observations. This characteristic is obtainable in the present invention thru the use of the spring 4 which closely approximates a zero length spring or one in which, when loaded so that the successive turns are separated, the force exerted on the spring is at all times proportional to the distance between the ends of the spring.

It is also necessary that some form of damping be provided to bring the system to a position of rest. This is accomplished by the provision of a damping chamber which includes upwardly extending members 17 between which the beam portion 7 moves in close juxtaposition.

Suitable clamping means (not shown) are provided for clamping the moving elements during transportation of the instrument. However, in order to protect the instrument against undesirable effects from tilting or inadvertent impact of the instrument when the moving system thereof is free for movement, adjusting screws are mounted upon pillars generally indicated as 18 on the floor of the housing 1. These screws are so positioned and adjusted that the mass 3 is free for limited movement only in longitudinal, transverse and vertical directions.

The operation of the instrument as described is believed apparent but reference will be made thereto by way of summary. As explained the instrument is maintained at a substantially constant temperature and, with the moving system clamped, the instrument is moved to a desired location and is leveled preliminary to unclamping of the moving system. Thereupon the force responsive system assumes a position which is determined by gravitational attraction at that point. The system soon comes to rest and the position is noted by observing the hairline 14'. This position of the hairline may be selected as a position of reference or predetermined position to which reference is made at subsequent stations. Once such predetermined position is established it is necessary only at subsequent stations to rotate the screw 78 sufficient to return the moving system to the predetermined position. Recordings are made of the necessary movement of the adjusting screw 78 and in this manner the variations in gravitational attraction from point to point are accurately determinable.

We claim:

1. In a gravity measuring instrument the combination comprising a mass, a plurality of elastic members supporting said mass, a support, one of said members being a zero length spring, the point of attachment of said spring to the support being substantially in a vertical plane passing through the points of attachment of the other elastic members, means for moving the upper point of attachment of the zero length spring a determinable amount to bring the mass to a predetermined position, said last mentioned means comprising an anchor block to which the upper end of said spring is attached, said anchor block being attached to the support by leaf springs, a lever and spaced leaf springs attached thereto and to said support and block respectively, whereby the effective point of support is movable a predetermined amount by said lever as a measure of variations in the force of gravity acting upon the mass.

2. A measuring instrument of the class described comprising a mass, a support, a spring attached to said support and mass and exerting a force through the center of gravity of the mass to support the mass, said support comprising a fixed member and a movable member, said spring having its upper end attached to the movable member, leaf springs having their ends attached to the fixed and movable members, means for moving said movable member a measurable amount to bring the mass to a predetermined position and means for measuring the displacement of the movable member to move the mass to such position.

3. A measuring instrument of the class described comprising, a mass, means suspending the mass including a support, a spring having its ends attached to the support and mass, the points of attachment of the spring being spaced both vertically and horizontally whereby the force applied by the spring is exerted at an angle inclined to the horizontal, means for applying a resilient horizontal force to the mass to overcome the horizontal component of force exerted by said spring, said support comprising a fixed member and a movable member, said spring having its upper end attached to said movable member, a plurality of leaf springs having their ends attached to the movable and fixed members respectively, and means for moving said movable member a determinable amount to bring said mass to a predetermined position.

4. A force measuring instrument including a mass, means suspending the mass including a support therefor comprising a fixed member, a plurality of leaf springs attached thereto, a movable member attached to the free ends of said springs, a spring having its ends attached to the movable member and the mass respectively and extending therebetween at an angle of inclination with the vertical to produce a vertical component of force to counterbalance the force of gravity acting upon the mass, means for applying a resilient horizontal force to the mass to counterbalance the horizontal component exerted by sad spring, and means for moving said movable member a determinable amount to bring said mass to a predetermined position.

5. In a gravity measuring instrument the combination of, a mass, a plurality of elastic members resiliently supporting said mass, at least one of said members being effective as a zero-length spring, the points of attachment of the elastic members to the support being substantially in a vertical plane, and means for moving the point of attachment of the zero-length spring a measurable amount to bring the mass to a predetermined position, said measurable amount constituting a measure of the force of gravity at the location of the instrument, said last mentioned means comprising an anchor block to which said zero length spring is attached, a lever and spaced leaf springs attached to said lever, the opposite end of one of said leaf springs being fixed, and the opposite end of the other of said leaf springs being attached to said block.

6. A measuring instrument of the class described comprising a mass, a support, a spring attached to said support and mass and exerting a force acting upwardly through the mass to support the mass, said support including a fixed member and a movable member interconnected by leaf springs, a lever extending substantially parallel to said leaf springs, spaced leaf springs attached to said lever and to said movable and fixed members respectively, and means for moving the end of said lever a determinable amount to bring the mass to a predetermined position.

7. A gravity meter comprising a support, a weight member, means suspending the weight member from the support to move in response to variations in the force of gravity, said means including a block and a resilient tension member attached thereto, flexible but inextensible means interconnecting said block and support, a lever having the ends of a pair of spaced flexible but inextensible means fixed thereto, the other ends of the last mentioned means being fixed respectively to the support and to the said block and means for moving the end of the lever a determinable amount.

8. A gravity meter comprising a support, a weight member, means suspending the weight member from the support to move in response to variations in the force of gravity, said means including a block and a resilient tension member attached thereto, flexible but inextensible means interconnecting said block and support, a lever having the ends of a pair of spaced flexible but inextensible means fixed thereto, the other ends of the last mentioned means being fixed respectively to the support and to the said block, a second lever, flexible but inextensible means interconnecting a point on said second lever to the support, additional flexible but inextensible means connecting another point of the second lever to the first mentioned lever, and means for moving the end of the second lever a determinable amount.

9. A device for accurate linear adjustment comprising, a pair of relatively movable members one of which is fixed, flexible but inextensible means interconnecting said members, a pair of spaced flexible but inextensible means connected respectively to said members, a lever, the other ends of said last mentioned means being fixed to said lever, and means for moving the end of the lever a determinable amount whereby there is a relative movement of the members of a known amount.

10. A device for accurate linear adjustment comprising, a support, a member movable relative to said support, flexible but inextensible means interconnecting said support and member, a lever, a pair of spaced flexible but inextensible means fixed thereto, the other ends of the last mentioned means being fixed respectively to the support and the member, a second lever, flexible but inextensible means interconnecting a point on said second lever to the support, additional flexible but inextensible means connecting another point of the second lever to the first mentioned lever, and means for moving the end of the second lever a determinable amount thereby effecting adjustment of the position of said member relative to the support.

LUCIEN J. B. LA COSTE.
ARNOLD ROMBERG.